United States Patent
Qing

(10) Patent No.: US 11,810,390 B2
(45) Date of Patent: Nov. 7, 2023

(54) METHOD FOR FINGERPRINT DETECTION, FINGERPRINT SENSOR AND ELECTRONIC DEVICE

(71) Applicant: SHENZHEN GOODIX TECHNOLOGY CO., LTD., Guangdong (CN)

(72) Inventor: Xiaogang Qing, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/844,908

(22) Filed: Jun. 21, 2022

(65) Prior Publication Data

US 2022/0319226 A1 Oct. 6, 2022

Related U.S. Application Data

(63) Continuation of application No. PCT/CN2020/137782, filed on Dec. 18, 2020.

(51) Int. Cl.
*G06V 40/13* (2022.01)
*G06V 10/141* (2022.01)
*G06V 10/147* (2022.01)

(52) U.S. Cl.
CPC ........ *G06V 40/1318* (2022.01); *G06V 10/141* (2022.01); *G06V 10/147* (2022.01)

(58) Field of Classification Search
CPC . G06V 40/1318; G06V 10/141; G06V 10/147
See application file for complete search history.

(56) References Cited

U.S. PATENT DOCUMENTS

| 2019/0197287 A1 | 6/2019 | Han et al. |
| 2020/0327293 A1* | 10/2020 | Kurasawa .......... G06V 40/1306 |
| 2021/0056286 A1* | 2/2021 | Cheng ................. G06F 1/3265 |

FOREIGN PATENT DOCUMENTS

| CN | 101203084 A | 6/2008 |
| CN | 103489429 A | 1/2014 |
| CN | 104184954 A | 12/2014 |
| CN | 109147666 A | 1/2019 |
| CN | 109255278 A | 1/2019 |
| CN | 109891429 A | 6/2019 |

(Continued)

*Primary Examiner* — Stephen G Sherman
(74) *Attorney, Agent, or Firm* — Scully, Scott, Murphy & Presser, P.C.

(57) ABSTRACT

A method for fingerprint detection, which may more easily reduce an influence of a brightness change of a display screen on the fingerprint detection and improve performance of the fingerprint detection. The method for the fingerprint detection includes: receiving a synchronization signal of a display screen, the synchronization signal being configured to trigger a pixel array of a fingerprint sensor to expose, where a period of the synchronization signal is synchronized with a dimming period of the display screen, and the dimming period includes a bright period and a dark period; exposing each row of pixels in the pixel array in sequence based on triggering of the synchronization signal, so that a position of the pixel whose exposure time corresponding to the dark period in the pixel array is constant, where data of each row of the pixels after exposure is configured to obtain a fingerprint image.

17 Claims, 6 Drawing Sheets

(56) References Cited

FOREIGN PATENT DOCUMENTS

| | | |
|---|---|---|
| CN | 110010069 A | 7/2019 |
| CN | 110210364 A | 9/2019 |
| CN | 110268418 A | 9/2019 |
| CN | 110705411 A | 1/2020 |
| CN | 110945526 A | 3/2020 |
| CN | 110956939 A | 4/2020 |
| CN | 111164607 A | 5/2020 |
| CN | 111486950 A | 8/2020 |
| CN | 111898415 A | 11/2020 |

* cited by examiner

500

510 — receive a synchronization signal of a display screen configured to trigger a pixel array of a fingerprint sensor to expose, a period of the synchronization signal is synchronized with a dimming period T1 of the display screen, and the dimming period includes a bright period and a dark period 520 — expose each row of pixels in the pixel array in sequence depend on triggering of the synchronization signal, so that a position of the pixel whose exposure time corresponding to the dark period in the pixel array is constant

FIG. 5

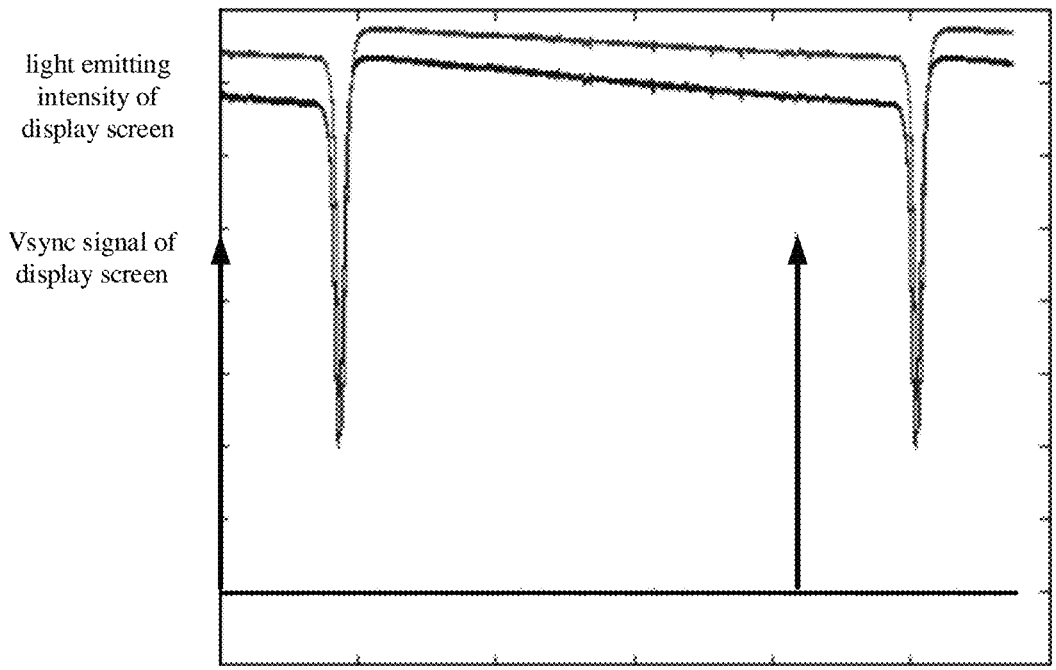

FIG. 6

METHOD FOR FINGERPRINT DETECTION, FINGERPRINT SENSOR AND ELECTRONIC DEVICE

CROSS-REFERENCE TO RELATED APPLICATIONS

This application is a continuation of International Application No. PCT/CN2020/137782, filed on Dec. 18, 2020, the disclosure of which is hereby incorporated by reference in its entirety.

TECHNICAL FIELD

Embodiments of the present application relate to the field of information technology, and in particular, to a method for fingerprint detection, a fingerprint sensor and an electronic device.

BACKGROUND

Current electronic devices pursue a higher screen-to-body ratio and need to move more front-side devices under a screen, such as proximity sensors and ambient light sensors. For an ambient light sensor, when it is provided under a display screen of an electronic device, the ambient light sensor needs to detect a light intensity of an ambient light that penetrates the display screen. Therefore, it is extremely vulnerable to a brightness of the display screen when detecting the ambient light, which affects accuracy of ambient light detection. The display screen may dim its brightness according to a certain dimming period so that the ambient light sensor may detect the ambient light. In order to improve the accuracy of the ambient light detection, some display screens may increase a length of the dimming period of the display screen, and increase a length of time that the display screen is in a dark light in each dimming period. This affects collection of fingerprint images by the fingerprint sensor under the display screen, and reduces performance of the fingerprint detection.

SUMMARY

Embodiments of the present application provide a method for fingerprint detection, a fingerprint sensor and an electronic device, which may more easily reduce an influence of a brightness change of a display screen on the fingerprint detection and improve performance of the fingerprint detection.

In a first aspect, a method for fingerprint detection is provided, including:
  receiving a synchronization signal of a display screen, the synchronization signal being configured to trigger a pixel array of a fingerprint sensor to expose, where a period of the synchronization signal is synchronized with a dimming period of the display screen, and the dimming period includes a bright period and a dark period;
  exposing each row of pixels in the pixel array in sequence based on triggering of the synchronization signal, so that a position of the pixel whose exposure time corresponding to the dark period in the pixel array is constant, where data of each row of the pixels after exposure is configured to obtain a fingerprint image.

In a possible implementation manner, the exposure time of one row of the pixels in the pixel array is equal to an integer multiple of the dimming period.

In a possible implementation manner, the synchronization signal is a vertical synchronization signal output by the display screen, or the synchronization signal is another signal maintaining synchronization with the vertical synchronization signal.

In a possible implementation manner, a synchronization pin is provided on the fingerprint sensor for connecting with the display screen, and the receiving the synchronization signal of the display screen including: receiving the synchronization signal output by the display screen through the synchronization pin.

In a possible implementation manner, the fingerprint sensor is connected with a host, the receiving the synchronization signal of the display screen includes: receiving the synchronization signal of the display screen through the host.

In a possible implementation manner, the host is a processor of an electronic device, or the host is a microprogrammed control unit (MCU) of the fingerprint sensor.

In an possible implementation manner, the exposing each row of the pixels in the pixel array in sequence based on triggering of the synchronization signal includes: exposing each row of the pixels in the pixel array in sequence when a rising edge or a falling edge of the synchronization signal arrives; or exposing each row of the pixels in the pixel array in sequence after delaying a certain time when the rising edge or the falling edge of the synchronization signal arrives.

In a possible implementation manner, the dimming period is configured for an ambient light sensor under the display screen to detect an ambient light of the electronic device.

In a second aspect, a fingerprint sensor is provided, including a pixel array and a control circuit connected with the pixel array, and the control circuit being configured to:
  receive a synchronization signal of a display screen, the synchronization signal configured to trigger a pixel array of a fingerprint sensor to expose, where a period of the synchronization signal is synchronized with a dimming period of the display screen, and the dimming period includes a bright period and a dark period;
  control each row of pixels in the pixel array to expose in sequence based on triggering of the synchronization signal, so that a position of the pixel whose exposure time corresponding to the dark period in the pixel array is constant, where data of each row of the pixels after exposure is configured to obtain a fingerprint image.

In a possible implementation manner, the exposure time of one row of the pixels in the pixel array is equal to an integer multiple of the dimming period.

In a possible implementation manner, the synchronization signal is a vertical synchronization signal output by the display screen, or the synchronization signal is another signal maintaining synchronization with the vertical synchronization signal.

In a possible implementation manner, a synchronization pin is provided on the fingerprint sensor for connecting with the display screen, and the receiving the synchronization signal of the display screen including: receiving the synchronization signal output by the display screen through the synchronization pin.

In a possible implementation manner, the fingerprint sensor is connected with a host, the receiving the synchronization signal of the display screen includes: receiving the synchronization signal of the display screen through the host.

In a possible implementation manner, the host is a processor of an electronic device, or the host is a MCU of the fingerprint sensor.

In a possible implementation manner, the exposing each row of pixels in the pixel array in sequence based on triggering of the synchronization signal includes: exposing each row of the pixels in the pixel array in sequence when a rising edge or a falling edge of the synchronization signal arrives; or exposing each row of the pixels in the pixel array in sequence after delaying a certain time when the rising edge or the falling edge of the synchronization signal arrives.

In a third aspect, an electronic device is provided, including a display screen; an ambient light sensor provided under the display screen; and the fingerprint sensor in any implementation manner in the second aspect.

In a possible implementation manner, the ambient light sensor is configure to detect an ambient light of the electronic device based on the dimming period.

Based on the above technical solution, when a brightness of the display screen is adjusted based on the dimming period, time proportions of the bright period and the dark period encountered in the exposure time of different pixel rows in the pixel array of the fingerprint sensor are different, resulting in a random horizontal stripe generated in the fingerprint image formed by data of the pixel array. However, when using the synchronization signal of the display screen to trigger the pixel array to exposure, since the exposure time of the pixel array is always synchronized with the synchronization signal of the display screen, and the dimming period of the display screen is also synchronized with the synchronization signal, so that a position of the pixel whose exposure time corresponding to the dark period in the dimming period in the pixel array is constant and a position of the pixel corresponding to the bright period is also constant, so as to enable a position of the above horizontal stripe to be fixed. In this way, when processing data of the exposed pixel array, it is easier to use a fingerprint algorithm to eliminate the horizontal stripe with a fixed position, thereby improving the performance of the fingerprint detection.

BRIEF DESCRIPTION OF DRAWINGS

FIG. 5 is a schematic flowchart of a method for fingerprint detection according to an embodiment of the present application.

FIG. 6 is a schematic diagram of a relationship between a dimming period and a vertical synchronization signal of a display screen.

DESCRIPTION OF EMBODIMENTS

The following describes the technical solution of the present application with reference to accompanying drawings.

Current electronic devices pursue a higher screen-to-body ratio and need to move more front-side devices under a screen, such as proximity sensors and ambient light sensors. Especially when an ambient light sensor is provided under a display screen, the ambient light sensor needs to detect a light intensity of an ambient light that penetrates the display screen. Therefore, it is extremely vulnerable to a brightness of the display screen when detecting the ambient light, which affects accuracy of ambient light detection. To this end, in order to improve the accuracy of the ambient light detection, some display screens have changed a display mode of the display screen, increased a length of a dimming period used to adjust the brightness of the display screen (high duty cycle), and increased a length of time the display is in the dark period in each dimming period (high drop ratio). The adjustment of the brightness of the display screen directly affects collection of fingerprint images by the fingerprint sensor under the display screen, and reduces performance of the fingerprint detection.

Figure 1:
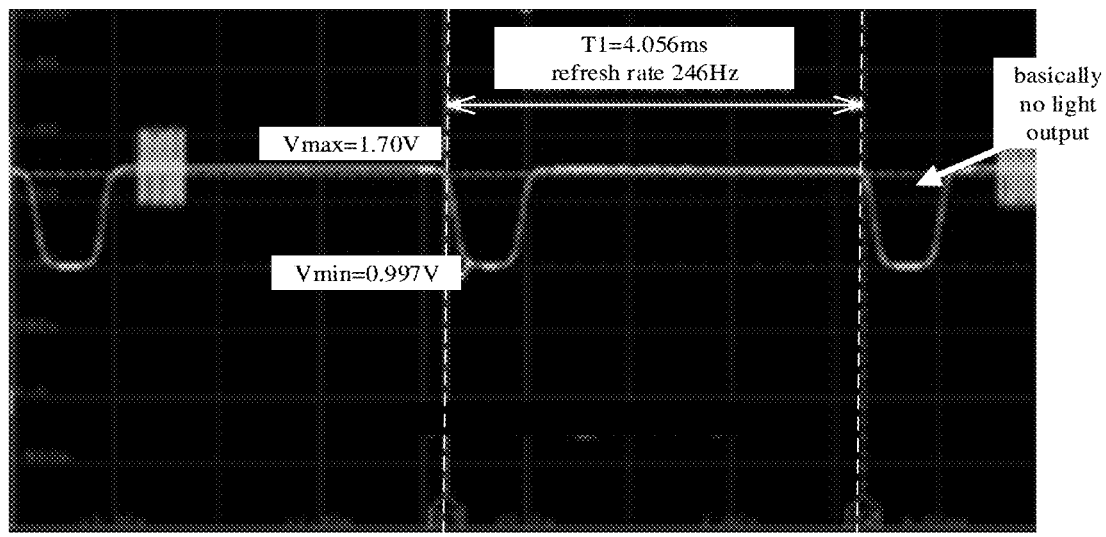
FIG. 1 is a schematic diagram of a dimming period of a display.

For example, a dimming period of a certain type of a screen shown in FIG. 1 is also called a drop period, and a dimming period includes a bright period and a dark period. In a dimming period T1 shown in FIG. 1, a signal strength in the bright period is Vmax=1.07V, and a signal strength in the dark period is Vmin=0.997V. It can be seen that in the dark period of the dimming period, the display screen basically has no light output, and the ambient light sensor is not affected by the light intensity of the display screen, so as to more accurately detect the light intensity of the ambient light where the electronic device is currently located. However, if a user performs the fingerprint detection at this time, it is necessary to use a light emitted by the display screen to expose a pixel array in the fingerprint sensor, then such display mode of the display screen shall affect the fingerprint detection.

Figure 2:
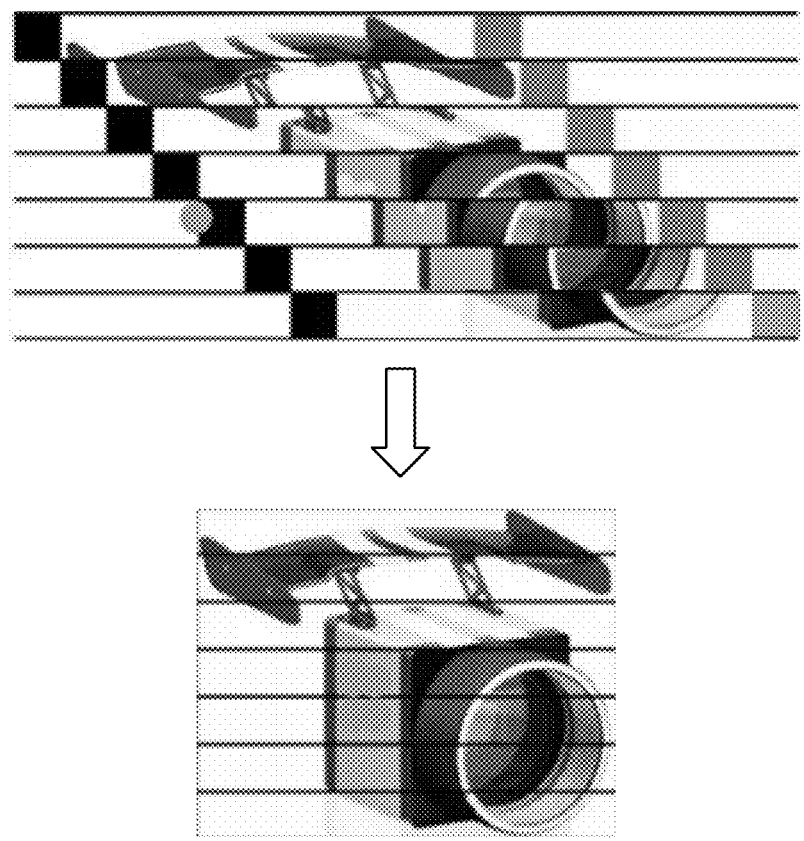
FIG. 2 is a schematic diagram of exposing each row of pixels in a rolling shutter exposure manner.

A method for fingerprint detection provided by the embodiments of the present application may be applied to fingerprint sensors using various exposure methods, and is particularly suitable for the fingerprint sensor using a rolling shutter manner for exposure. FIG. 2 shows an exposure process of rolling shutter. A fingerprint sensor array includes M row(s)×N column(s) of pixels, which is illustrated by taking M=7 as an example in FIG. 2. As shown in FIG. 2, the pixels in the same row in the pixel array are exposed at the same time, and after a certain period of exposure of the pixels in this row, the pixels in the next row are exposed at the same time. Next, the subsequent rows of the pixels are exposed in sequence. A time difference between start times of exposure of two adjacent rows of the pixels, for example, may generally be equal to data read time of one row of the pixels, so that read times of the exposed data of different pixel rows do not overlap. Then, the exposed data of M rows of the pixels is processed and spliced to form a complete image.

Exposure time of one row of the pixels in the pixel array of the fingerprint sensor is, for example, usually more than 30 ms, and the exposed date of each pixel is actually an integration of an optical signal it receives during the exposure time. For example, the dimming period of the display screen is usually 16.6 ms, 8.3 ms, 4.1 ms, or the like. It can be seen that the exposure time of one row of the pixels is often longer than the dimming period of the display screen. Exposure is a process in which the pixel superimposes or integrates the light received during the exposure time. If some pixel rows happen to encounter the display screen dimming its brightness in the process of integrating the light, the pixel row shall not receive the light in the dark period of the dimming period, resulting in small data of the pixel row. In this way, with respect to the entire pixel array, the exposed data of each row of the pixels is not flat, and a horizontal stripe shall be generated on the finally obtained image.

The number of the horizontal stripe is usually equal to $(M \times t)/(1000 \text{ ms}/R)$, where M is the number of the pixel row in the pixel array, and t is the exposure time of one row of the pixels. Since the pixels in the same row are exposed at the same time, so t may also be the exposure time of a single pixel; R is a refresh rate of the display screen, that is, a scanning frequency of a vertical synchronization signal (denoted as a Vsync signal) of the display screen. In the embodiments of the present application, a relationship between the dimming period of the display screen and a scanning period of the Vsync signal may be an integer multiple. For example, preferably, the dimming period of the display screen may equal to the scanning period of the Vsync signal.

The exposure of the pixel is an integration process of light in the exposure time. When the exposure time of one row of the pixels is an integer multiple of the dimming period of the display screen, since lengths of the bright period and the dark period included in the exposure time of each pixel are equal, a level of data obtained from the integration of each row of the pixels is basically the same, and there shall be no the horizontal stripe.

Figure 3:
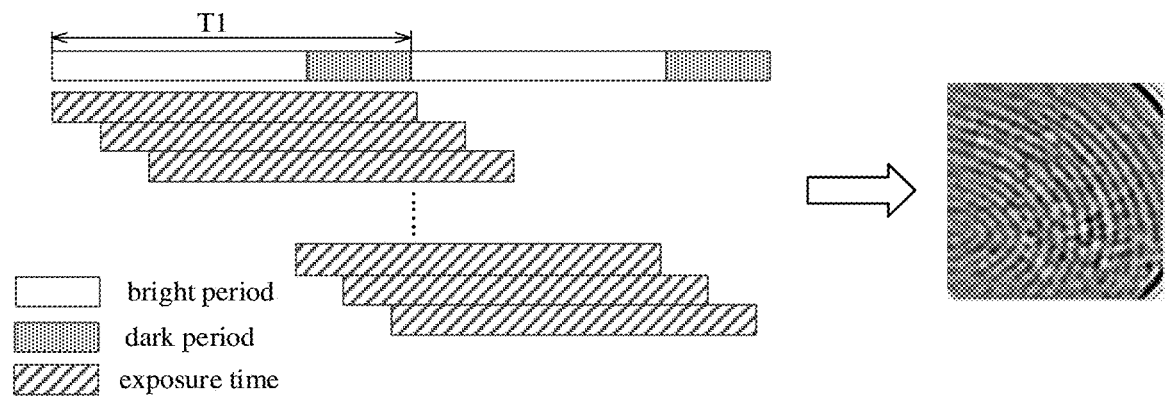
FIG. 3 is a schematic diagram of a fingerprint image obtained when exposure time of one row of pixels is an integer multiple of a dimming period.

FIG. 3 shows a case where exposure time of one row of pixels is equal to one dimming period. It can be seen that although each row of the pixels has experienced dimming of the display screen during the exposure time thereof, time of the bright period and the dark period experienced by each row of the pixels during the exposure time thereof are equal, so the finally obtained fingerprint image shall not appear the horizontal stripe.

Figure 4:
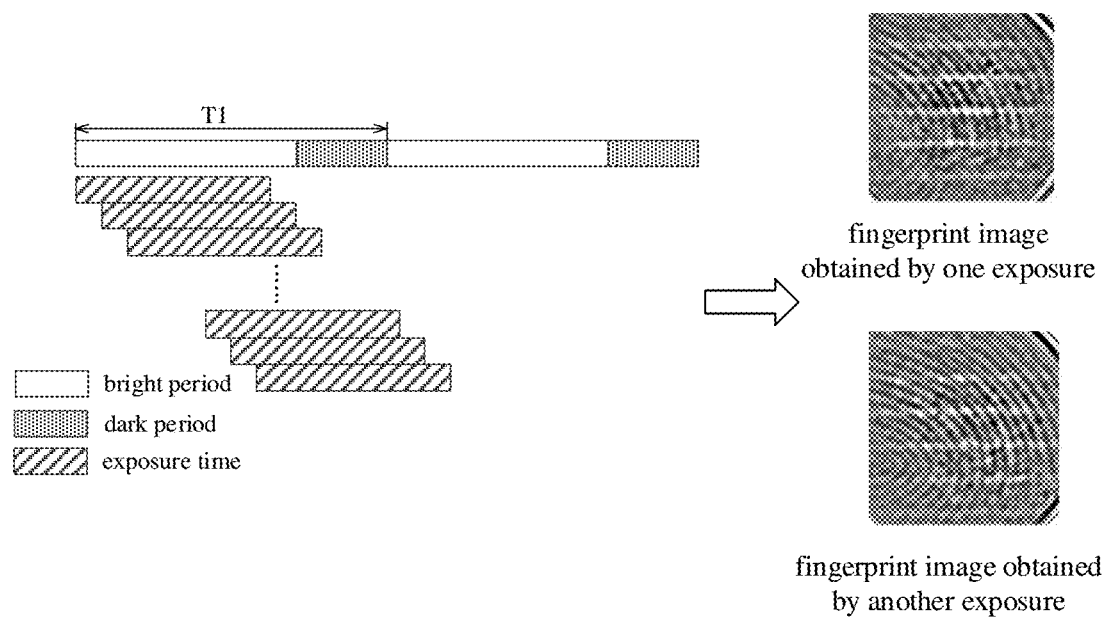
FIG. 4 is a schematic diagram of a fingerprint image obtained when exposure time of one row of pixels is a non-integer multiple of a dimming period.

FIG. 4 shows a case when exposure time of one row of pixels is a non-integer multiple of a dimming period. The first row shows the dimming period T1, and the following rows represent the exposure time of each pixel row in the pixel array. It can be seen that the time of the bright period and dark period experienced by different pixel rows in the exposure time thereof are not equal, so the obvious horizontal stripe is on the finally obtained fingerprint image. Moreover, since a dimming operation of a display and an exposure process of the fingerprint sensor are independent, a position of the horizontal stripe on a fingerprint image obtained during each fingerprint detection also changes, so it is difficult to use a subsequent fingerprint algorithm to eliminate the horizontal stripe.

However, in a practical application, if the exposure time of one row of the pixels is configured to be an integer multiple of the dimming period, the following problems may exist. On the one hand, since a dimming system and a fingerprint detection system of the display screen are two independent systems with their own clocks, jitter of the dimming period makes it difficult to ensure that the exposure time of one row of the pixels is exactly the integer multiple of the dimming period, so the horizontal strip may not be completely eliminated. On the other hand, different types of the fingerprint sensors have their own characteristics. If the exposure time of these fingerprint sensors are deliberately configured to be equal, that is, equal to the integer multiple of the dimming period, performance of different fingerprint detection chips may not play to the best.

To this end, the embodiments of the present application provide a method for fingerprint detection, which may more easily reduce an influence of a brightness change of the display screen on the fingerprint detection and improve the performance of the fingerprint detection.

FIG. 5 is a schematic flowchart of a method for fingerprint detection according to an embodiment of the present application. A method 500 shown in FIG. 5 may be performed by a fingerprint sensor including a pixel array composed of a plurality of pixels. As shown in FIG. 5, the method 500 may include part of or all the following steps.

In step 510, a synchronization signal of the display screen is received.

Among them, the synchronization signal is configured to trigger the pixel array of the fingerprint sensor to expose. A period of the synchronization signal is synchronized with the dimming period T1 of the display screen, and the dimming period T1 includes the bright period and the dark period.

It should be understood that the dimming period T1 is a period the display screen adjusting its brightness, and it can be understood that the brightness of the display screen is adjusted once every time T1 elapses. Among them, each dimming period T1 includes one bright period and one dark period. For example, it can be understood that the display screen turns down its brightness and lasts for a certain time once every T1 elapses, and the duration is the dark period in the dimming period; in other words, the display screen turns up its brightness and lasts for a certain time once every T1 elapses, and the duration is the bright period in the dimming period. The present application does not limit the lengths of the bright period and the dark period, nor does it limit a specific size of the brightness of the display screen in the bright period and the dark period.

Optionally, the dimming period may be configured for an ambient light sensor under the display screen to detect an ambient light of the electronic device. In other words, the dimming period may be used for the ambient light sensor to detect the ambient light of the electronic device. Specifically, the ambient light sensor may detect the ambient light in an environment where the electronic device is currently located during the dark period of the dimming period based on the dimming period. That is, the dimming period may be used as a basis for the ambient light sensor to detect the ambient light.

In step 520, each row of the pixels in the pixel array is exposed in sequence based on triggering of the synchronization signal, so that a position of the pixel whose exposure time corresponding to the dark period in the pixel array is constant.

Among them, data of each row of the pixels after exposure is configured to obtain a fingerprint image.

In this embodiment, when the brightness of the display screen is adjusted based on the dimming period, time proportions of the bright period and the dark period encountered in the exposure time of different pixel rows in the pixel array of the fingerprint sensor are different, resulting in a random horizontal stripe generated in the fingerprint image formed by the data of the pixel array. However, when using the synchronization signal of the display screen to trigger the pixel array to exposure, since the exposure time of the pixel array is always synchronized with the synchronization signal of the display screen, and the dimming period of the display screen is also synchronized with the synchronization signal, so that a position of the pixel whose exposure time corresponding to the dark period in the dimming period in the pixel array is constant and a position of the pixel corresponding to the bright period is also constant, so as to enable a position of the above horizontal stripe to be fixed. In this way, when processing the data of the exposed pixel array, it is easier to use the fingerprint algorithm to eliminate the horizontal stripe with the fixed position, thereby improving the performance of the fingerprint detection.

It should be noted here that a purpose of a fingerprint detection method in the embodiments of the present application is to make the position of the horizontal stripe appearing in the fingerprint image formed on the basis of the data of the pixel array to be fixed, rather than randomly changing at each fingerprint detection. In this way, it is easier to use the fingerprint algorithm to process the horizontal stripe by designing the fingerprint algorithm, so as to eliminate an influence of the horizontal stripe on a fingerprint detection result.

The synchronization signal of the display screen may be the vertical synchronization signal of the display screen; or another signal maintaining synchronization with the vertical synchronization signal, such as a horizontal synchronization signal (referred to as a Hsync signal) corresponding to a specific pixel row.

FIG. 6 shows a relationship between a dimming period and a vertical synchronization signal of a display screen. It is assumed that the Vsync signal of the display screen is used as the synchronization signal for triggering the pixel array to expose, and the dimming period of the display screen is equal to the scanning period of the Vsync signal of the display screen. It can be seen from FIG. 6 that the dimming period of the display screen is synchronized with the scanning period of the Vsync signal of the display screen, that is, a phase difference between the dimming period of the display screen and the scanning period of the Vsync signal of the display screen is constant.

Then, when the Vsync signal of the display screen is used to trigger the pixel array to expose, the exposure time of the pixel array is also synchronized with the dimming period of the display screen, that is, a phase difference between the exposure time of the pixel array and the dimming period of the display screen is constant. In this way, in the pixel array, a position of the pixel whose exposure time corresponds to the dark period in the dimming period is constant, or in other words, a position of the pixel whose exposure time corresponds to the bright period in the dimming period is constant, so as to enable a position of the above horizontal stripe to be always fixed.

During the fingerprint detection, generally, after a light spot on the display screen for the fingerprint detection is lighten up, the fingerprint sensor starts to expose each row of the pixels in the pixel array in sequence; while using the fingerprint detection method in the embodiments of the present application, during the fingerprint detection, after the light spot on the display screen for the fingerprint detection is lighted up, the fingerprint sensor needs to wait for an arrival of the Vsync signal of the display screen before starting to expose each row of the pixels in the pixel array in sequence.

In the embodiments of the present application, the exposure time of one row of the pixels and the dimming period may be in a relationship of the integer multiple or not. Preferably, the exposure time of one row of the pixels may be configured to be equal to the integer multiple of the dimming period, such as 1 times.

In step 510, the fingerprint sensor may receive the synchronization signal of the display screen in the following two ways.

In an implementation manner, a synchronization pin may be provided on the fingerprint sensor for connecting with the display screen. In this case, in step 510, the fingerprint sensor may receive the synchronization signal of the display screen through the synchronization pin.

Figure 7:
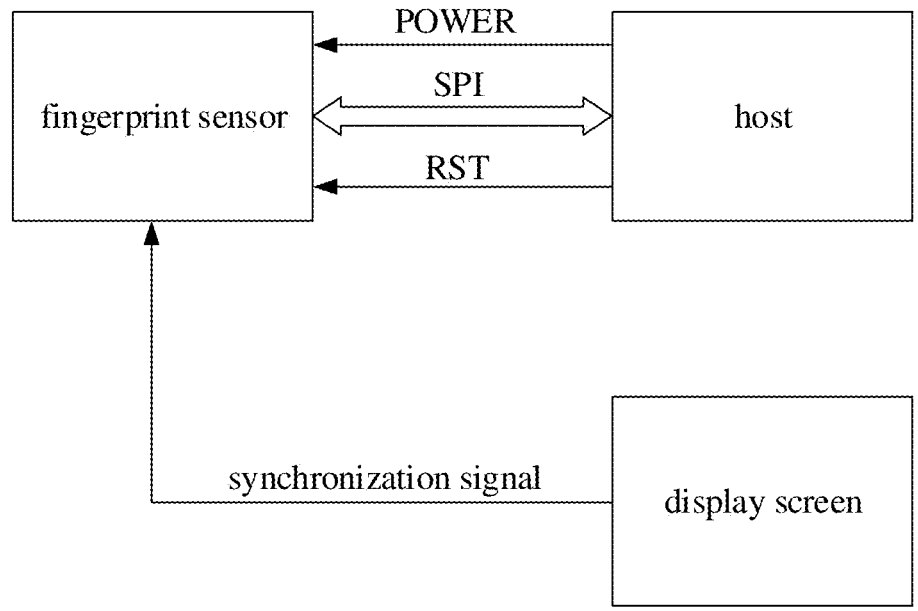
FIG. 7 is a schematic diagram of a manner in which a fingerprint sensor acquires a synchronization signal of a display screen.

For example, as shown in FIG. 7, the fingerprint sensor is connected to the display screen through the newly added synchronization pin, and may directly receive the synchronization signal output by the display screen to the fingerprint sensor for triggering the pixel array to expose. The fingerprint sensor and a host may communicate based on a serial peripheral interface (SPI), such as receiving commands from the host to perform operations related to the fingerprint detection, and uploading the acquired data of the pixel array to the host. The host may also provide a power to the fingerprint sensor and send a reset signal (RST) to the fingerprint sensor.

In the embodiments of the present application, the host may be a processor of the electronic device, such as the processor in a personal computer (PC) or a mobile phone, such as a host control, or the like; the host may also be a micro-programmed control unit, such as a MCU of the fingerprint sensor.

In another implementation manner, since the fingerprint sensor is connected to the host, in step 510, the fingerprint sensor may receive the synchronization signal of the display screen through the host.

Figure 8:
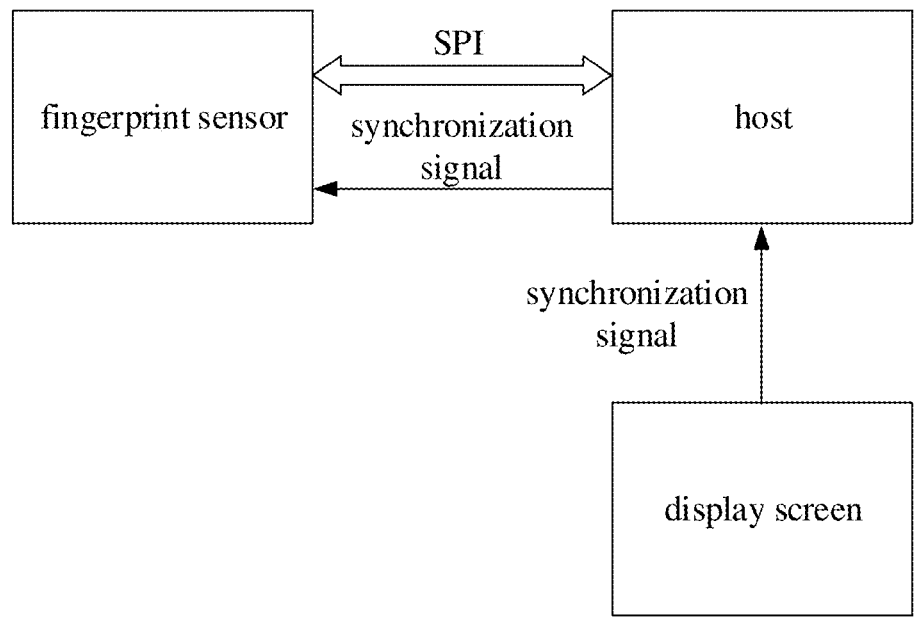
FIG. 8 is a schematic diagram of another manner in which a fingerprint sensor acquires a synchronization signal of a display screen.

For example, as shown in FIG. 8, the fingerprint sensor does not need to be directly connected to the display screen, and the synchronization signal output by the display screen may be transmitted to the fingerprint sensor through the host. When the fingerprint sensor obtains the synchronization signal of the display screen in this indirect way, since a communication delay between the fingerprint sensor and the host is constant, when the fingerprint sensor exposes the pixel array based on the synchronization signal of the display screen, the exposure time is still synchronized with the synchronization signal of the display screen, and thus is synchronized with the dimming period of the display screen, without being affected by this delay.

In step 520, the fingerprint sensor may expose each row of the pixels in the pixel array in the following two ways.

In an implementation manner, the fingerprint sensor may start to expose each row of the pixels in the pixel array in sequence when a rising edge or a falling edge of the synchronization signal arrives.

In another implementation manner, the fingerprint sensor may expose each row of the pixels in the pixel array in sequence after delaying a certain time when the rising edge or the falling edge of the synchronization signal arrives.

No matter which manner is adopted, as long as the exposure time is synchronized with the synchronization signal of the display screen, the position of the pixel whose exposure time corresponding to the dark period in dimming period may be constant, and the position of the pixel corresponding to the bright period may be constant, so as to ensure the position of the above horizontal strip to be fixed. In this way, when processing the data of the exposed pixel array, it is easier to use the fingerprint algorithm to eliminate the horizontal stripe with the fixed position, thereby improving the performance of the fingerprint detection.

The embodiments of the present application further provide a fingerprint sensor, which may also be referred to as a fingerprint chip, a sensor chip, or the like. The fingerprint sensor may perform the method for the fingerprint detection in any of the above embodiments, and for a detailed description of the fingerprint sensor, reference may be made to the description of the aforementioned method for the fingerprint detection.

Figure 9:
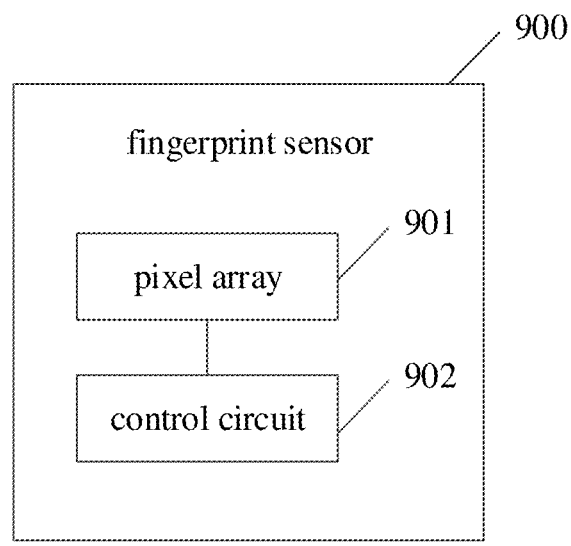
FIG. 9 is a schematic diagram of a fingerprint sensor according to an embodiment of the present application.

As shown in FIG. 9, the fingerprint sensor 900 includes a pixel array 901, and a control circuit 902 connected to the pixel array 901, and the control circuit 902 is configured to:

receive a synchronization signal of a display screen, the synchronization signal being configured to trigger the pixel array 901 to expose, where a period of the synchronization signal is synchronized with a dimming period of the display screen, and the dimming period includes a bright period and a dark period;

controlling each row of pixels in the pixel array 901 to expose in sequence based on triggering of the synchronization signal, so that a position of the pixel whose exposure time corresponding to the dark period in the pixel array 901 is constant, where data of each row of the pixels after exposure is configured to obtain a fingerprint image.

Optionally, in an implementation manner, the exposure time of one row of the pixels in the pixel array 901 is equal to an integer multiple of the dimming period.

Optionally, in an implementation manner, the synchronization signal is a vertical synchronization signal output by the display screen, or the synchronization signal is another signal maintaining synchronization with the vertical synchronization signal.

Optionally, in an implementation manner, a synchronization pin is provided on the fingerprint sensor 900 for connecting with the display screen, and the receiving the synchronization signal of the display screen including: receiving the synchronization signal output by the display screen through the synchronization pin.

Optionally, in an implementation manner, the fingerprint sensor 900 is connected with a host, the receiving the synchronization signal of the display screen includes: receiving the synchronization signal of the display screen through the host.

Optionally, in an implementation manner, the host is a processor of the electronic device, or the host is a MCU of the fingerprint sensor 900.

Optionally, in an implementation manner, the exposing each row of the pixels in the pixel array 901 in sequence based on triggering of the synchronization signal includes: exposing each row of the pixels in the pixel array 901 in sequence when a rising edge or a falling edge of the synchronization signal arrives; or exposing each row of the pixels in the pixel array 901 in sequence after delaying a certain time when the rising edge or the falling edge of the synchronization signal arrives.

The embodiments of the present application further provide an electronic device, including a display screen; an ambient light sensor provided under the display screen; and the fingerprint sensor in any one of the above embodiments.

Optionally, in an implementation manner, the ambient light sensor is configure to detect an ambient light of the electronic device based on the dimming period.

Figure 10:
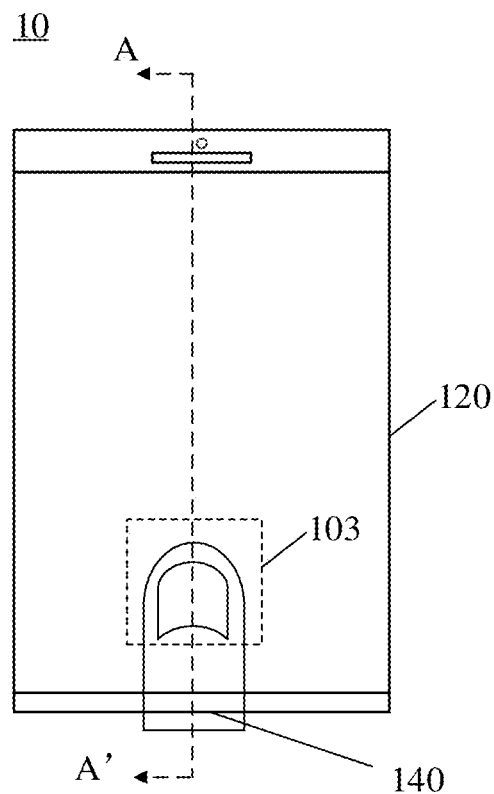
FIG. 10 is a schematic diagram of a possible electronic device according to an embodiment of the present application.
Figure 11:
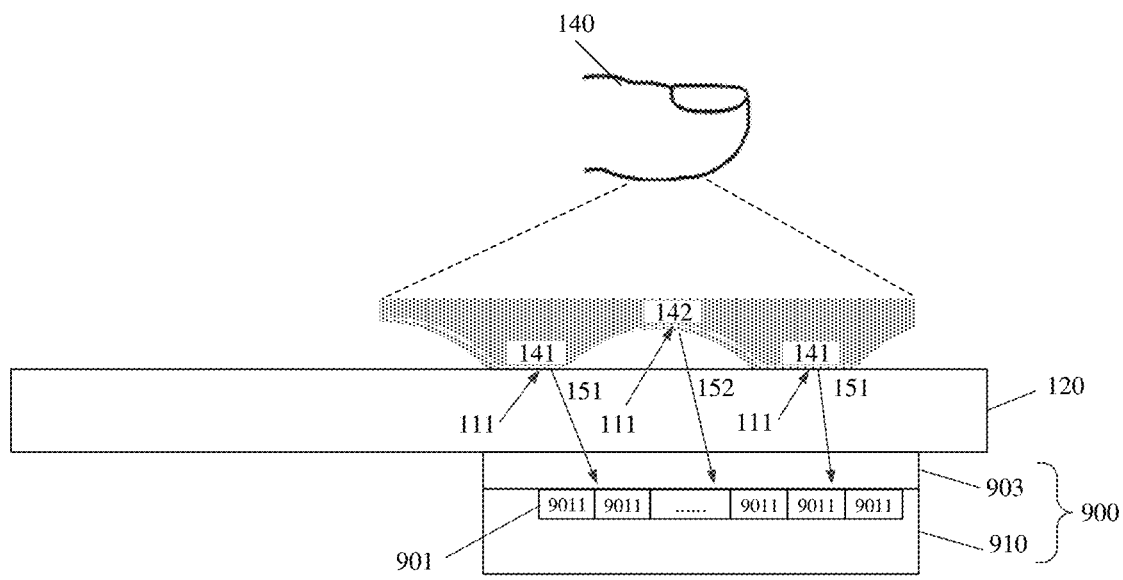
FIG. 11 is a schematic structural diagram of a possible fingerprint sensor according to an embodiment of the present application.

FIGS. 10 and 11 provide a possible structure of a fingerprint sensor according to an embodiment of the present application. FIG. 10 is an orientation schematic diagram of an electronic device 10, and FIG. 11 is a partial schematic cross-sectional diagram of the electronic device 10 shown in FIG. 10 along a A-A' direction. The electronic device 10 includes a display screen 120, an ambient light sensor provided under the display screen 120, and a fingerprint sensor 900.

As shown in FIG. 11, the fingerprint sensor 900 includes a light detecting section 910 and an optical path guiding structure 903. The optical path guiding structure 903 is provided above the light detecting section 910. The light detecting section 910 includes the pixel array 901 composed of a plurality of pixels 9011, the control circuit 902 connected to the pixel array 901, or the like. Among them, as shown in FIG. 10, an area where the pixel array 901 is located or a sensing area thereof is a fingerprint detection area 103 of the fingerprint sensor 900. The optical path guiding structure 903 is used to guide a light signal returned by a finger above the fingerprint detection area 103 to the pixel array 901.

The embodiments of the present application do not make any limitation on the optical path guiding structure 903 in the fingerprint sensor 900. For example, the optical path guiding structure 903 may include a microlens array composed of a plurality of microlenses. Furthermore, at least one light blocking layer may be provided under the microlens array, where each light blocking layer is provided with a plurality of openings corresponding to the plurality of microlenses, and the pixel array 901 includes a plurality of pixels corresponding to the plurality of microlenses. Each microlens is used to condense the light signal returned by the finger to the corresponding opening in each light blocking layer, so that the light signal passes the corresponding opening in each light blocking layer in sequence, and is transmitted to the corresponding pixel 9011 in the pixel array 901.

For another example, the optical path guiding structure 903 may include a collimator layer manufactured on a semiconductor silicon wafer, which has a plurality of collimation units or a microhole array, and the collimation unit may be a small hole.

Figure 12:
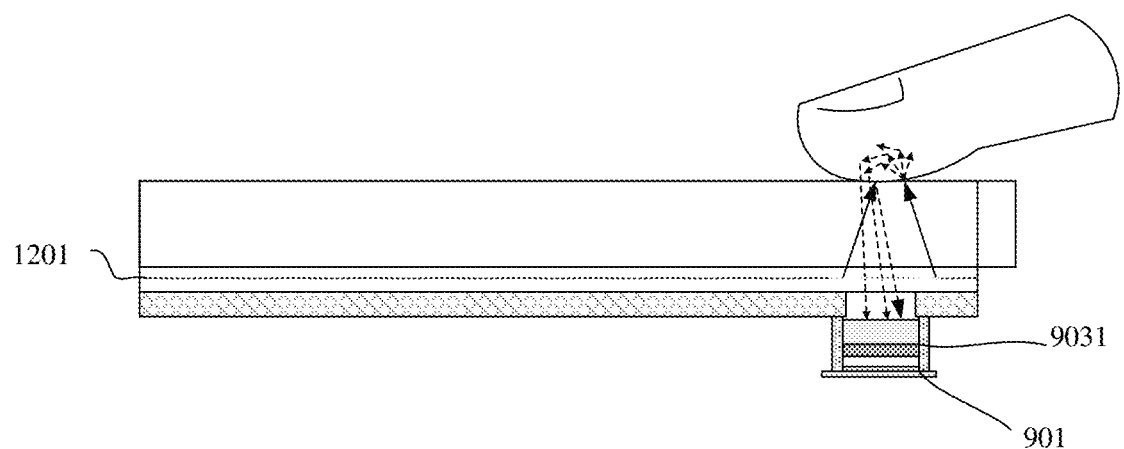
FIG. 12 is a schematic diagram of a possible optical path guiding structure according to an embodiment of the present application.

For another example, the optical path guiding structure 903 may include an optical lens layer having one or more lens units, and the lens unit may be a lens group composed of one or more aspherical lenses. For example, as shown in FIG. 12, the optical path guiding structure may include a lens 9031. The light emitted by a light emitting layer 1201 in the display screen irradiates the finger, and the light returned through the finger may be condensed to the pixel array 901 of an optical fingerprint sensor through the lens 9031.

When performing the fingerprint detection, the display screen 120 emits a beam of light 111 to a finger 140 above the fingerprint detection area 103, and the light 111 is reflected on a surface of the finger 140 to form a reflected light or form a scattered light by scattering inside the finger 140. Since a ridge 141 and a valley 142 of the fingerprint have different reflection capabilities for the light, a reflected light 151 from a fingerprint ridge and a reflected light 152 from a fingerprint valley have different light intensities, and after the reflected light passes the optical path guiding structure 903, it is received by the pixel array 901 and converted into a corresponding electrical signal, that is, a fingerprint detection signal. Based on the fingerprint detection signal, the data of the fingerprint image may be obtained, and further used for fingerprint matching and verification, so as to implement a function of optical fingerprint detection in the electronic device 10.

Furthermore, the electronic device 10 may further include an excitation light source for the fingerprint detection.

Among them, the display screen 120 may adopt a display screen having a self-emitting display unit, such as an organic light-emitting diode (OLED) display screen or a micro-light-emitting diode (Micro-LED) display screen. Taking an OLED display screen as an example, the fingerprint sensor 900 may use a display unit located in the fingerprint detection area 103 in the OLED display screen 120 as the excitation light source for the optical fingerprint detection.

By way of example and not limitation, the electronic device in the embodiments of the present application may be portable or mobile computing devices such as terminal devices, mobile phones, tablet computers, notebook computers, desktop computers, gaming devices, in-vehicle electronic devices or wearable smart devices, and other electronic devices such as electronic databases, automobiles and automated teller machines (ATM). The wearable smart device includes devices with full functions and large-size that may implement complete or partial functions without relying on smart phones, such as smart watches or smart glasses, and devices that only focuses on a certain type of application function, and shall be used in cooperation with such other device as the smart phones, such as various types of smart bracelets, smart jewelry and other devices for physical sign monitoring.

It should be noted that, under a premise of no conflict, various embodiments and/or technical features in the various embodiments described in the present application may be combined with each other arbitrarily, and the technical solution obtained after the combination should also fall within the protection scope of the present application.

The systems, devices, and methods disclosed in the embodiments of the present application may be implemented in other manners. For example, some features of method embodiments described above may be omitted or not implemented. Device embodiments described above are only illustrative, and division of units is only a logical function division. In actual implementation, there may be other division methods, and a plurality of units or components may be combined or integrated into another system. In addition, a coupling between the various units or a coupling between the various components may be a direct coupling or an indirect coupling, and the above coupling includes electrical, mechanical or other forms of connection.

It should be understood that the specific examples in the embodiments of the present application are only to help those skilled in the art to better understand the embodiments of the present application, but not to limit the scope of the embodiments of the present application. Various modifications and variations which fall within the scope of the present application can be made by those skilled in the art based on the foregoing embodiments.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present disclosure shall be subject to the protection scope of the claims.

What is claimed is:

1. A method for fingerprint detection, comprising:
receiving a synchronization signal of a display screen, the synchronization signal being configured to trigger a pixel array of a fingerprint sensor to expose, wherein a period of the synchronization signal is synchronized with a dimming period of the display screen, and the dimming period comprises a bright period and a dark period;
exposing each row of pixels in the pixel array in sequence based on triggering of the synchronization signal, so that a position of a pixel whose exposure time corresponding to the dark period in the pixel array is constant, wherein data of each row of the pixels after exposure is configured to obtain a fingerprint image.

2. The method according to claim 1, wherein the exposure time of one row of the pixels in the pixel array is equal to an integer multiple of the dimming period.

3. The method according to claim 1, wherein the synchronization signal is a vertical synchronization signal output by the display screen, or the synchronization signal is another signal maintaining synchronization with the vertical synchronization signal.

4. The method according to claim 1, wherein a synchronization pin is provided on the fingerprint sensor for connecting with the display screen, and the receiving the synchronization signal of the display screen comprises:
receiving the synchronization signal output by the display screen through the synchronization pin.

5. The method according to claim 1, wherein the fingerprint sensor is connected with a host, the receiving the synchronization signal of the display screen comprises:
receiving the synchronization signal of the display screen through the host.

6. The method according to claim 5, wherein the host is a processor of an electronic device, or the host is a microprogrammed control unit (MCU) of the fingerprint sensor.

7. The method according to claim 1, wherein the exposing each row of the pixels in the pixel array in sequence based on triggering of the synchronization signal comprises:
exposing each row of the pixels in the pixel array in sequence when a rising edge or a falling edge of the synchronization signal arrives; or
exposing each row of the pixels in the pixel array in sequence after delaying a certain time when the rising edge or the falling edge of the synchronization signal arrives.

8. The method according to claim 1, wherein the dimming period is configured for an ambient light sensor under the display screen to detect an ambient light of the electronic device.

9. A fingerprint sensor, comprising a pixel array and a control circuit connected with the pixel array, and the control circuit being configured to:
receive a synchronization signal of a display screen, the synchronization signal configured to trigger a pixel array of a fingerprint sensor to expose, wherein a period of the synchronization signal is synchronized with a dimming period of the display screen, and the dimming period comprises a bright period and a dark period;
control each row of pixels in the pixel array to expose in sequence based on triggering of the synchronization signal, so that a position of a pixel whose exposure time corresponding to the dark period in the pixel array is constant, wherein data of each row of the pixels after exposure is configured to obtain a fingerprint image.

10. The fingerprint sensor according to claim 9, wherein the exposure time of one row of the pixels in the pixel array is equal to an integer multiple of the dimming period.

11. The fingerprint sensor according to claim 9, wherein the synchronization signal is a vertical synchronization signal output by the display screen, or the synchronization signal is another signal maintaining synchronization with the vertical synchronization signal.

12. The fingerprint sensor according to claim 9, wherein a synchronization pin is provided on the fingerprint sensor for connecting with the display screen, and the receiving the synchronization signal of the display screen comprises:
receiving the synchronization signal output by the display screen through the synchronization pin.

13. The fingerprint sensor according to claim 9, wherein the fingerprint sensor is connected with a host, the receiving the synchronization signal of the display screen comprises:
receiving the synchronization signal of the display screen through the host.

14. The fingerprint sensor according to claim 13, wherein the host is a processor of an electronic device, or the host is a micro-programmed control unit (MCU) of the fingerprint sensor.

15. The fingerprint sensor according to claim 9, wherein the exposing each row of the pixels in the pixel array in sequence based on triggering of the synchronization signal comprises:
exposing each row of the pixels in the pixel array in sequence when a rising edge or a falling edge of the synchronization signal arrives; or
exposing each row of the pixels in the pixel array in sequence after delaying a certain time when the rising edge or the falling edge of the synchronization signal arrives.

16. An electronic device, comprising:
a display screen;
an ambient light sensor provided under the display screen; and
a fingerprint sensor, comprising a pixel array and a control circuit connected with the pixel array, and the control circuit being configured to:
receive a synchronization signal of the display screen, the synchronization signal configured to trigger a pixel array of a fingerprint sensor to expose, wherein a period of the synchronization signal is synchronized with a dimming period of the display screen, and the dimming period comprises a bright period and a dark period;
control each row of pixels in the pixel array to expose in sequence based on triggering of the synchronization signal, so that a position of a pixel whose exposure time corresponding to the dark period in the pixel array is constant, wherein data of each row of the pixels after exposure is configured to obtain a fingerprint image.

17. The electronic device according to claim 16, wherein the ambient light sensor is configured to detect an ambient light of the electronic device based on the dimming period.

* * * * *